US006473442B1

(12) United States Patent
Lundsjö et al.

(10) Patent No.: US 6,473,442 B1
(45) Date of Patent: Oct. 29, 2002

(54) COMMUNICATIONS SYSTEM AND METHOD FOR MATCHING AND BALANCING THE BIT RATES OF TRANSPORT CHANNELS TO THE BIT RATE OF A PHYSICAL CHANNEL

(75) Inventors: Johan Lundsjö, Bromma; Per Beming; Per Narvinger, both of Stockholm, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/289,707

(22) Filed: Apr. 12, 1999

(51) Int. Cl.[7] .................................................. H04J 3/02
(52) U.S. Cl. ....................... 370/537; 370/320; 370/329
(58) Field of Search ................................. 370/324, 329, 370/336, 341, 347, 468, 498, 537, 252, 320; 455/453, 450

(56) References Cited

U.S. PATENT DOCUMENTS

| 6,052,385 | A | * | 4/2000 | Kanerva et al. | ............. | 370/468 |
| 6,137,779 | A | * | 10/2000 | Miller et al. | ................ | 370/236 |
| 6,307,867 | B1 | * | 10/2001 | Roobol et al. | ............... | 370/470 |
| 6,363,058 | B1 | * | 3/2002 | Roobol et al. | ............... | 370/310 |
| 2001/0024452 | A1 | * | 9/2001 | Liu et al. | ..................... | 370/468 |
| 2001/0046211 | A1 | * | 11/2001 | Maruwaka et al. | ......... | 370/252 |

FOREIGN PATENT DOCUMENTS

| EP | 0 627 827 A2 | 12/1994 |
| WO | WO 99/16264 | 4/1999 |

OTHER PUBLICATIONS

Standard Search Report for RS 103029US Completed Jan. 19, 2000.
Baier, Alfred et al., "Design Study for a CDMA–Based Third–Generation Mobile Radio System", IEEE Journal on Selected Areas in Communications, vol. 12, No. 4, May 1994, pp. 733–743.

* cited by examiner

*Primary Examiner*—Hassan Kizou
*Assistant Examiner*—Lu Yin
(74) *Attorney, Agent, or Firm*—Jenkens & Gilchrist PC (57) ABSTRACT

A communications system and method are provided that enables the balancing and rate matching of different types of services used simultaneously by a mobile terminal. More specifically, the communications system includes a network and mobile terminal either of which is capable of matching the bit rates of a plurality of transport channels each handling a service to a bit rate of a physical channel handling multiplexed services using relative offset measures and predefined rules. The network assigns and signals the relative offset measures to the mobile terminal.

33 Claims, 8 Drawing Sheets

COMMUNICATIONS SYSTEM AND METHOD FOR MATCHING AND BALANCING THE BIT RATES OF TRANSPORT CHANNELS TO THE BIT RATE OF A PHYSICAL CHANNEL

BACKGROUND OF THE INVENTION

1. Technical Field of the Invention

The present invention generally relates to the telecommunications field and, in particular, to a method and communications system that signals relative offset values to a mobile terminal so that both a network and mobile terminal can match and balance the bit rates of multiple transport channels handling multiple services to the bit rate of a physical channel handling multiplexed services.

2. Description of Related Art

Network operators estimate that in the beginning of the next millennium there will be more than 800 million mobile phone subscribers worldwide. By then, the number of wireless phones may equal or even exceed the number of wired phones.

As the millennium approaches, it is clear that the next significant development in wireless communications involves the standardization of third-generation wireless services. Third-generation wireless services will enable subscribers to, for example, make video calls to friends and colleagues from the mobile terminal, while simultaneously accessing a remote database from that same mobile terminal, or receiving E-mails and phone calls.

One possible platform or standard for third-generation wireless services is known as Wideband Code Division Multiple Access (WCDMA). The WCDMA standard supports both packet-switched and circuit switched communications such as Internet browsing and traditional landline telephone services, respectively. Telefonaktiebolaget LM Ericsson (assignee of the present application) is a main supporter of the WCDMA standard which has been submitted to the International Telecommunication Union (ITU). The ITU is the body that selects the platforms or standards that are to support the third-generation services to be used in what is known as a universal mobile telecommunications system (UMTS).

Regardless of which standard is selected by the ITU to provide third-generation wireless services, the UMTS will still be able to support many different services, at the same time, for a particular user of a mobile terminal. Each service including, for example, data, E-mail, speech, Internet, intranet, fax, video streaming, or video conferencing may have a different requirement or degree of quality (protection) when compared to the protection required for another service. For instance, the video conferencing service is likely to require a higher degree of quality (e.g., quality of service) or slightly more protection than that of the fax service.

The current WCDMA standard enables multiple services each of which has a different degree of protection to be used at the same time by one mobile terminal. However, none of the current standards provide for an efficient signaling principle that enables both a network and mobile terminal to match and balance the bit rates of multiple transport channels handling multiple services to the bit rate of a physical channel handling multiplexed services.

BRIEF DESCRIPTION OF THE INVENTION

The present invention is a communications system and method that enables the balancing and rate matching of different types of services used simultaneously by a mobile terminal. More specifically, the communications system includes a network and mobile terminal either of which is capable of matching the bit rates of a plurality of transport channels each handling a service to a bit rate of a physical channel handling multiplexed services using relative offset measures and predefined rules. The network assigns and signals the relative offset measures to the mobile terminal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Referring to the Drawings, wherein like numerals represent like parts throughout FIGS. 1–7, there are disclosed an exemplary communications system 100 and preferred method 600 in accordance with the present invention.

Although the communications system 100 will be described with reference to a universal mobile telecommunications system (UMTS) and WCDMA standard, it should be understood that the present invention can be used within any communications system that allows a mobile subscriber to use multiple services at the same time. Accordingly, the communications system 100 and preferred method 600 should not be construed in a limited manner.

Figure 1:
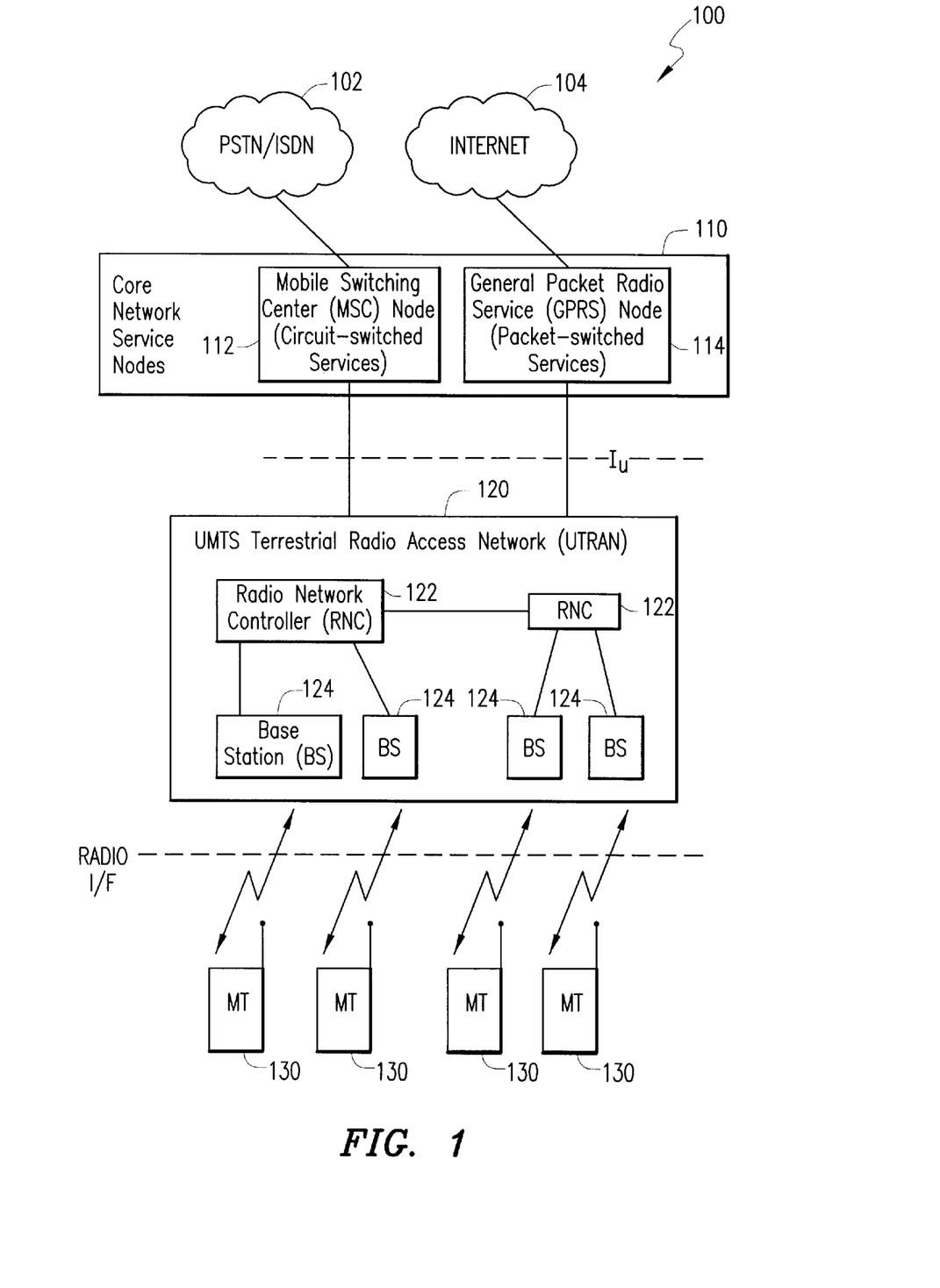
FIG. 1 is block diagram illustrating the basic components of an exemplary communications system in accordance with the present invention.

Referring to FIG. 1, there is a block diagram illustrating the basic components of the communications system 100. Certain details associated with the communications system 100 are known in the industry and as such need not be described herein. Therefore, for clarity, the description provided below in relation to the communications system 100 omits some components not necessary to understand the invention.

Generally, the communications system 100 operates to signal a plurality of rate matching offset values from a network to a mobile terminal, where each rate matching offset value is a relative quality measure indicative of a difference of quality between the various services currently used by the mobile terminal. The mobile terminal (during uplink communications) or network (during downlink communications) operates to match the bit rates of a plurality of transport channels each supporting a service to the bit rate of the physical channel supporting the multiplexed services by using predefined rules and rate matching offset values. Thereafter, the mobile terminal (during downlink communications) or the network (during uplink communications) operates to mirror the previous matching using predefined rules and the rate matching offset values.

The communications system 100 described in the context of the universal mobile telecommunications system (UMTS) can include a representative, connection-oriented, external core network, shown as a cloud 102, for example, the Public Switched Telephone Network (PSTN) and/or the Integrated Services Digital Network (ISDN). A representative, connectionless-oriented, external core network, shown as a cloud 104, may be, for example, the Internet. Both core networks 102 and 104 are coupled to corresponding service nodes at 110. The PSTN/ISDN connection-oriented network 102 is connected to a connection-oriented service node shown as a mobile switching center (MSC) node 112, which provides circuit-switched services. And, the Internet connectionless-oriented network 104 is connected to a General Packet Radio Service (GPRS) node 114 tailored to provide packet-switched type services.

Each of the core network service nodes 112 and 114 connects to a UMTS Terrestrial Radio Access Network (UTRAN) 120 over a UTRAN interface ($I_u$). The UTRAN 120 includes one or more radio network controllers (RNCs) 122. Each RNC 122 is connected to a plurality of base stations (BS) 124 and to any other RNCs in the UTRAN 120. Radio communications between the base stations 124 and mobile terminals (MT) 130 are by way of a radio interface. Radio access is based on the wideband-CDMA (WCDMA) standard with individual radio channels allocated using WCDMA spreading codes.

WCDMA provides the wide bandwidth for multimedia services and other high rate demands as well as robust features like diversity handoff and RAKE receivers to ensure high quality. As mentioned earlier, WCDMA is able to support many different services used at the same time by one of the mobile terminals 130. The different services include, for example, data, speech, Internet, intranet, fax, video streaming, video conferencing, electronic commerce, remote control, remote monitoring, interactive E-mail, messaging or certain types of entertainment each of which usually has a different degree of quality or protection when compared to a different type of service.

Figure 2:
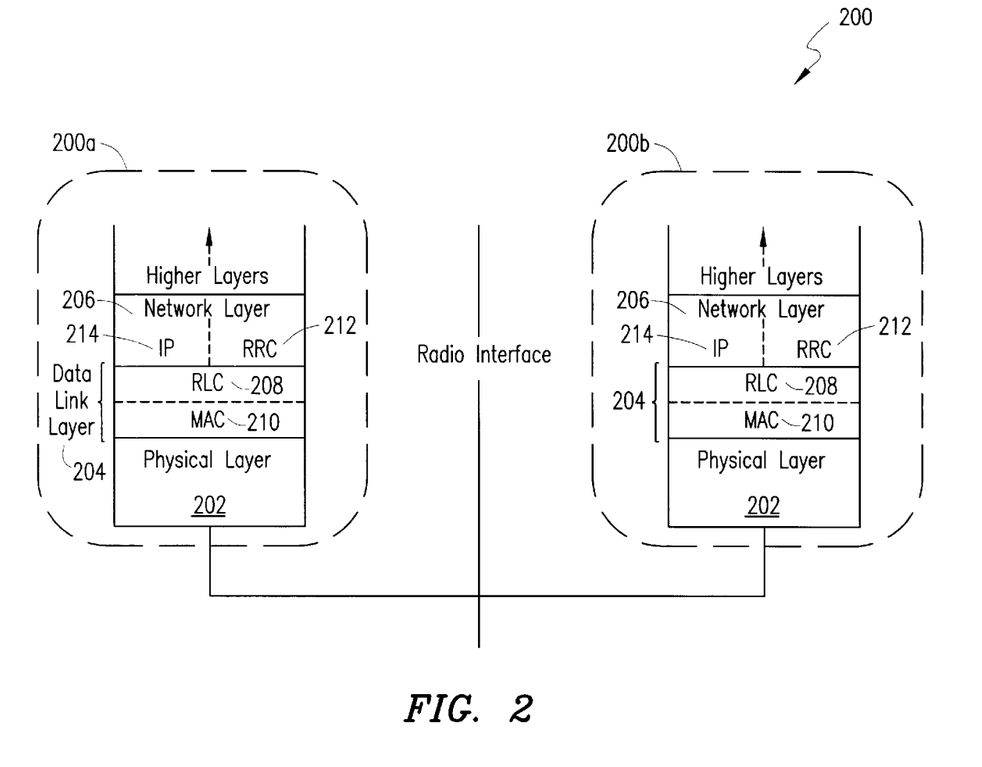
FIG. 2 is a block diagram illustrating several protocol layers of a radio interface shown in the communications system of FIG. 1.

Referring to FIG. 2, there is a block diagram illustrating several protocol layers 200 of the radio interface shown in FIG. 1. The mobile station 130 uses protocol stacks 200a to orchestrate communications with similar protocol stacks 200b in the UTRAN 120. Both protocol stacks include: a physical layer 202, a data link layer 204 and a network layer 206. The data link layer 204 is split into two sublayers: a radio link control (RLC) layer 208 and a medium access control (MAC) layer 210. The network layer 206 is divided in this example into a control plane protocol (RRC) 212 and a user plane protocol (IP) 214.

The control plane part 212 of the network layer 214 in the UTRAN 120 consists of a radio resource control protocol (RRC). The RRC protocol handles the control signaling over the radio interface, e.g., radio access bearer control signaling, measurement reporting and handover signaling. The user plane part 214 of the network layer 206 includes the traditional functions performed by layer 3 protocols such as the well-known Internet Protocol (IP).

The RLC 208 of the network layer 204 performs various functions including the establishment, release, and maintenance of an RLC connection, segmentation and reassembly of variable length, higher layer PDUs into/from smaller RLC PDUS, concatenation, error correction by retransmission (ARQ), in sequence delivery of higher layer PDUs, duplicate detection, flow control, and other functions. And, the medium access control (MAC) layer 210 provides unacknowledged transfer of service data units (SDUs) between peer MAC entities. The MAC functions include selecting an appropriate transport format for each transport channel (e.g., services offered by layer 1 to layer 2) depending on data rate, priority handling between data flows of one user and between data flows of different users, scheduling of control messages, multiplexing and demultiplexing of higher layer PDUs, and other functions.

The physical layer 202 provides information transfer services over the air interface using WCDMA which performs the following functions: forward error correction encoding and decoding, macrodiversity distribution/combining, soft handover execution, error detection, multiplexing and demultiplexing of transport channels, mapping of transport channels onto physical channel(s), modulation and spreading/demodulation and despreading of physical channels, frequency and time synchronization, power control, RF processing, and other functions. A more detailed discussion regarding the mapping of transport channels onto the physical channel(s) within the physical layer 202 is provided with respect to FIG. 3.

Figure 3:
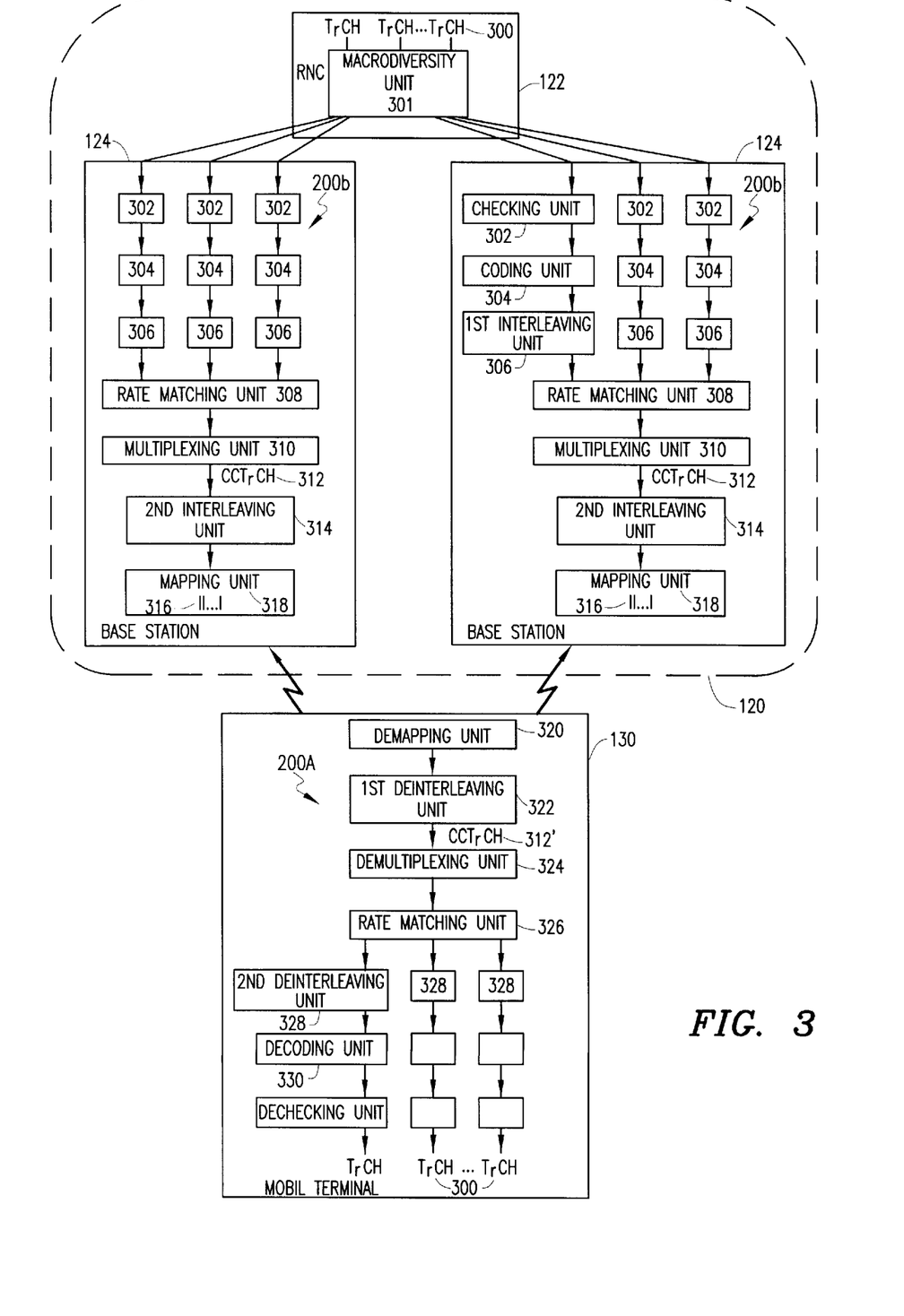
FIG. 3 is a block diagram illustrating in greater detail a physical layer of the radio interface between a mobile terminal and network of the communications system of FIG. 1.

Referring to FIG. 3, there is illustrated in greater detail the architecture and operation of the physical layers 202 within the mobile terminal 130 and UTRAN 120. Each RNC 122 can setup one or more transport channels (TrCHs) 300 (only three shown) depending on the number of services a particular mobile terminal 130 is going to use at one time. Again, each service is supported by or handled on one of the transport channels 300.

The RNC 122 includes a macrodiversity unit 301 operable to split and combine the transport channels 300 before they are distributed to the corresponding base stations 124 (only two shown). Each base station 124 includes a checking unit 302 that operates to add cyclic redundancy check (CRC) bits (e.g., 16 bits) to a block of bits on the respective transport channel. The checking unit 302 connects to a channel coding unit 304 which operates to code the block of bits output from the checking unit. A first interleaving unit 306 performs an interleaving operation on the coded block of bits received from the channel coding unit 304. Thereafter, all of the interleaved blocks of bits associated with each transport channel 300 are input to a rate matching unit 308.

Figure 3A:
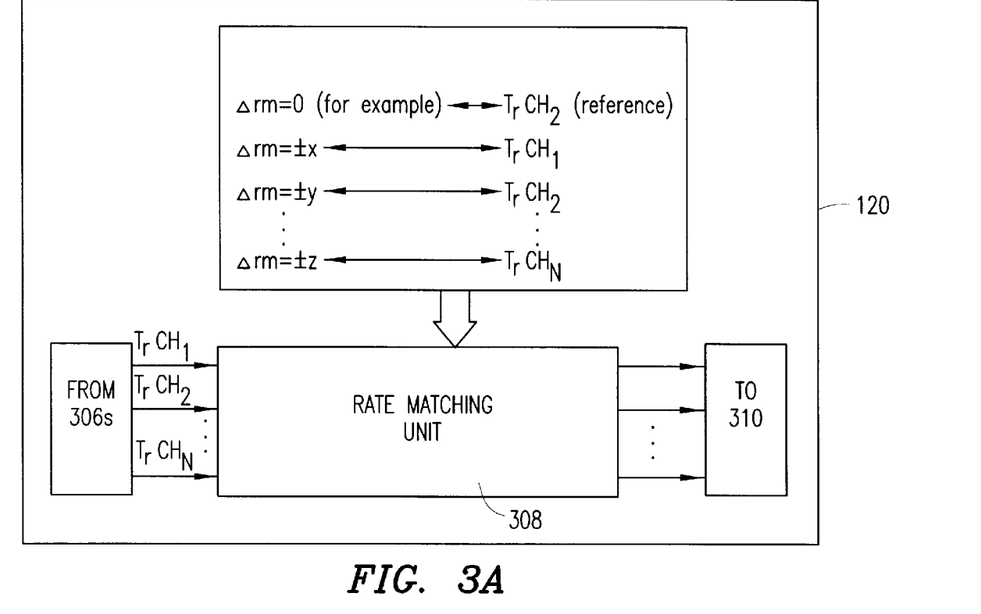
FIG. 3a is a block diagram illustrating a rate matching unit incorporated within the network of FIG. 3.

Referring also to FIG. 3a, the rate matching unit 308 generally operates to match and balance the various bit rates of the transport channels 300 to a bit rate of a composite transport channel (CCTrCH) 312, where the transport channels are multiplexed by a multiplexing unit 310 that outputs the CCTrCH. The matching and balancing operations within the rate matching unit 308 are performed using predefined rules and rate matching offset values (described below).

More specifically, the rate matching unit 308 operates to select one of the transport channels to be a reference transport channel which, for example, can be the transport channel containing the dedicated control signaling. The UTRAN 120 can change the reference transport channel by signaling a definition as to which one of the remaining transport channels is to be a new reference transport channel. The UTRAN 120 can signal this definition while tearing down the previous reference transport channel. Moreover, when the UTRAN 120 set up a new transport channel, it assigns a new rate matching offset value to the new channel, and the new value is signaled to the mobile terminal 130.

The UTRAN 120 assigns a reference rate matching offset value (e.g., $\Delta$rm=0) to the reference transport channel. However, the reference rate matching offset value does not need to be assigned if the value is always the same (e.g., $\Delta$rm=0). In addition, the UTRAN 120 assigns a rate matching offset value (e.g., $\Delta$rm=±X) to each of the remaining transport channels 300. Refer to FIG. 3a, the rate matching unit 308 has an input indicating the association between the individual rate matching offset values (e.g., $\Delta$rm=0, ±X, ±Y or ±Z) to the corresponding transport channels (e.g., $TrCH_{ref}$, $TrCH_1$, $TrCH_2$ or $TrCH_n$).

The rate matching offset values are communicated from the UTRAN 120 to the mobile station 130 using the RRC protocol (see RRCs 212 in FIG. 2). This signaling can be done each time a new transport channel is established. Basically, the RRC 212 of the UTRAN 120 sends assignments and configuration messages to the RRC 212 of the mobile terminal 130 enabling each RRC 212 to configure their respective lower layers locally.

Each rate matching offset value can indicate the amount of rate matching required on a transport channel relative to the amount required on the reference transport channel. Or in other words, each rate matching offset value is a relative measure indicating the relative quality associated with a particular service on a particular transport channel 300 as compared to the quality associated with the reference transport channel.

In some embodiments, the rate matching offset values could be direct measures of how much "more/repetition" or "less/puncturing" needs to be applied to a block of bits on a particular transport channel 300 as compared to the block of bits on the reference transport channel in order to maintain the desired quality. In such embodiments, the respective rate matching offset values are not absolute rate matching amount values, but rather are measures of the relative quality between the transport channels 300.

Alternatively, in other embodiments, the rate matching offset values could be representations of desired differences in quality between different transport channels 300. The desired differences in quality could be represented as differences in "energy per bit/noise" ($E_b/N_o$) targets, or differences in "energy per symbol/noise" ($E_s/N_o$) targets with no specific rate matching of the transport channels 300. $N_o$ includes both the noise and interference (of course, this could be approximated to be only noise). The distribution of rate matching could take into account that the same amounts of repetition or puncturing could affect the $E_b/N_o$ or $E_s/N_o$ quality to different degrees.

It should be understood that if several services are carried by the same transport channels, the quality on these channels cannot be balanced relatively to each other using rate matching. However, the transport channels can be jointly balanced relatively to other services carried by other transport channels.

After all of the rate matching offset values have been assigned and prior to matching the various bit rates of the transport channels 300 to the bit rate of the CCTrCH 312, the rate matching unit 308 operates to determine how many bits (if any) are to be added or removed from one or more of the transport channels so that the bit rate of the CCTrCH can match the bit rate of the physical channel 316. If bits are to be added/repeated, then predefined rules (see e.g., FIGS. 4a and 4b) are followed in order to match the bit rates of the transport channels 300 to the bit rate of physical channel 316. Otherwise if bits are to be removed/punctured, then further predefined rules (see e.g., FIGS. 5a and 5b) are followed in order to match the bit rates of the transport channels 300 to the bit rate of physical channel 316.

After matching the various bit rates of the transport channels 300 to the bit rate of the CCTrCH 312, the block of bits associated with the CCTrCH 312 are interleaved by a second interleaving unit 314. The interleaved block of bits is mapped onto at least one physical channel 316 using a mapping unit 318. It is possible to use more than one physical channel 316 in the event one physical channel does not have enough capacity to handle the multiplexed transport channels 300 of the CCTrCH 312.

As mentioned above, the mobile terminal 130 and UTRAN 120 each use similar physical layers 202 to enable communications for different services to occur simultaneously therebetween. Therefore in accordance with the present invention, the mobile terminal 130 is configured to receive the block of bits associated with the physical channel 316 and all of the rate matching offset values that are transmitted from the base station 124. Basically, the mobile terminal 130 operates to mirror the previous rate matching operations performed in the rate matching unit 308 of the base station 124 by using predefined rules and the received rate matching offset values. Thus, enabling both the mobile terminal 130 and the base station 124 to know the correct balancing.

More specifically, the mobile station 130 includes a demapping unit 320 operable to convert the received block of bits on the physical channel 316 into an interleaved block of bits. The interleaved block of bits are input to a first deinterleaving unit 322 that outputs a block of bits associated with a CCTrCH 312' which "should" correspond to the CCTrCH 312 in the base station 124. The block of bits on the CCTrCH 312' are input to a demultiplexing unit 324 that outputs a number of blocks of bits that are input to the rate matching unit 326. The number of blocks of bits corresponds to the number of transport channels 300.

The rate matching unit 326 operates to mirror the rate matching performed by the rate matching unit 308 using predefined rules and the received rate matching offset values (see FIGS. 4 and 5). That is, repeated bits are taken away before decoding, and bits that need to be added before decoding are inserted at places where the UTRAN 120 applied puncturing. The mobile terminal 120 and, more particularly, the rate matching unit 326, is able to do that from the knowledge from configuration signaling (e.g., instantaneous bit rates) carried out by the RRC protocol (described below).

Figure 3B:
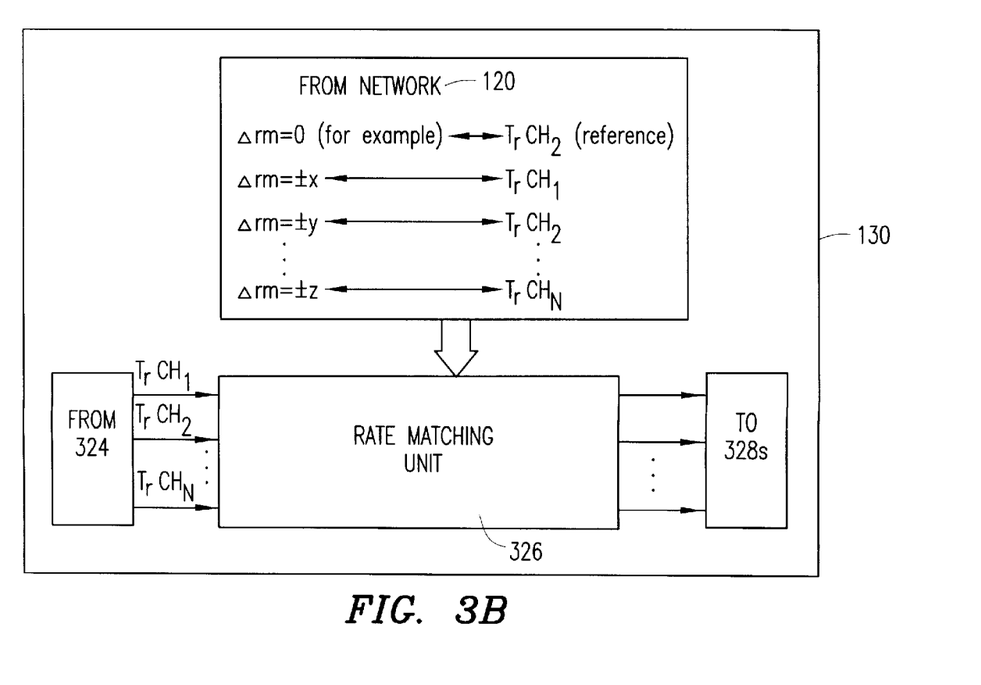
FIG. 3b is a block diagram illustrating a rate matching unit incorporated within the mobile terminal of FIG. 3.

Refer to FIG. 3b, the rate matching unit 326 has an input indicating the association between the individual rate matching offset values (e.g., $\Delta$rm=0, ±X, ±Y or ±Z signaled from the UTRAN 120) to the corresponding transport channels (e.g., $TrCH_{ref}$, $TrCH_1$, $TrCH_2$ or $TrCH_n$). As mentioned earlier, the rate matching offset values are communicated from the UTRAN 120 to the mobile station 130 using the RRC protocol (see RRCs 212 in FIG. 2). This signaling can be done each time a new transport channel is established. Basically, the RRC 212 of the UTRAN 120 sends assignments and configuration messages to the RRC 212 of the mobile terminal 130 enabling each RRC 212 to configure their respective lower layers locally.

It should be understood that to be able to mirror the previous rate matching operation, the rate matching unit 326 determines the instantaneous bit rates or the original size of each block of bits for each transport channel 300 using predefined rules which do not require the information to be sent from the base station 124. For instance, the RRC protocol configures the lower protocol layers (on both ends) in such a way that a limited number of bit rates may occur on each transport channel. The actual bit rates and number of bit rates is configured through RRC signaling when a transport channel is added. However, the configuration can also be changed through the same type of signaling even when transport channels are not added or released. Given the limited set of possible bit rates (assigned by RRC), suitable bit rate (within the set) is selected instantaneously on the transmitting end (e.g., mobile terminal 130 in uplink or network 120 in downlink). The selection within the assigned set depends, for example, on the source rate. The physical layer reserves a field transmitted in each 10 ms frame which is used to point to the currently selected bit rates on all transport channels of the MS-network connection. So, by reading this field in each frame, the receiving side (e.g., mobile terminal 130 in downlink or network 120 in uplink) knows what bit rates within the set assigned by the RRC 212 are used on each transport channel in this particular frame. Alternatively, it is possible to determine the rate by simply testing all possible bit rates (within the assigned set) to try the corresponding rate matching, decoding, deinterleaving, and so on, until a correct CRC is achieved.

Assuming the rate matching has been correctly distributed between the transport channels, each block of bits output from the rate matching unit 326 is input to a respective second deinterleaving unit 328 which outputs an deinterleaved block of bits. Each deinterleaved block of bits is input to a decoding unit 330 which outputs a decoded block of bits. Each decoded block of bits is input to a dechecking unit 330 that operates to remove the cyclic redundancy check (CRC) bits originally added by the checking unit 302 in the base station 124. Therefore, each dechecking unit 330 outputs a block of bits on a respective transport channel 300' which should correspond with the block of bits on the corresponding transport channel 300 in the base station 124.

Although only the downlink communications from the base station 124 to the mobile terminal 130 have been described, uplink communications from the mobile terminal 130 to the base station 124 can also occur in accordance with the present invention. In such a situation, the rate matching described above with respect to the base station 124 is performed by the mobile terminal 130, and the mirroring operations described above with respect to the mobile terminal is performed by the base station. In either case, the UTRAN 120 signals the rate offset matching values to the mobile terminal 130.

Figure 4A:
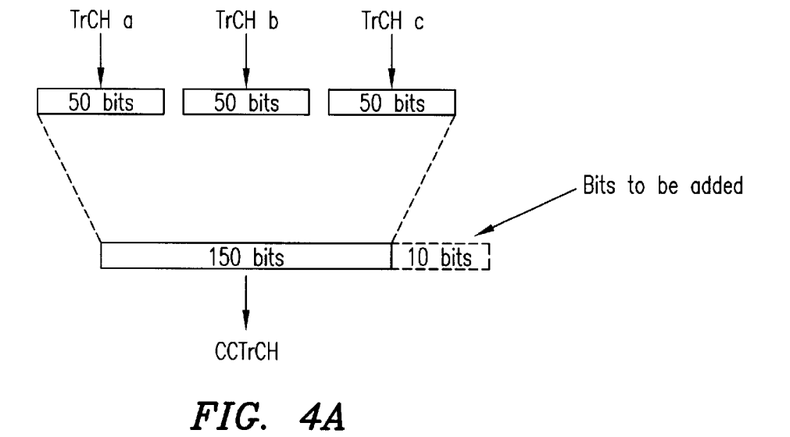
FIGS. 4a and 4b are diagrams of pre- and post-matching results of a first example illustrating how to determine total rate matching in accordance with the present invention.
Figure 4B:
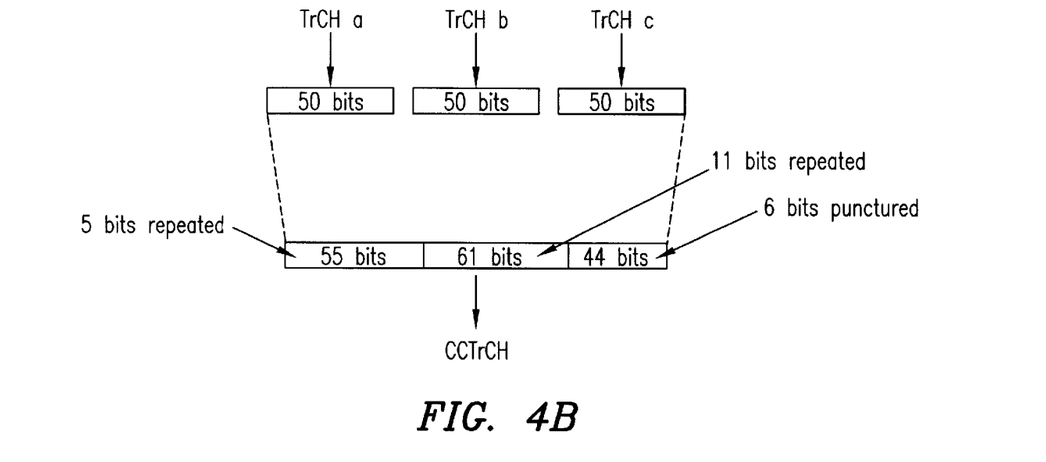

Referring to FIGS. 4a and 4b, there are illustrated the pre-rate matching bit rates (FIG. 4a) and the post-rate matching bit rates (FIG. 4b) of the transport channels and the CCTrCH after applying the predefined rules in a situation where bits are to be added to the CCTrCH in order to match the physical channel. It should be understood that the following example is only one of many ways to determine total rate matching using rate matching offset values in accordance with the present invention.

For illustrative purposes, three transport channels are described and shown as TrCHa, TrCHb and TrCHc. Let the corresponding rate matching offset values assigned to the transport channels be as follows: $\Delta rma=0$; $\Delta rmb=1/10$; and $\Delta rmc=-1/5$. The TrCHa has been selected to be the reference transport channel. Thus, TrCHb will get more protection than TrCHa, while TrCHc will get less protection than TrCHa. Assume that at a particular time instance respective 50 bit (encoded) blocks from each of the transport channels are to be multiplexed into one block of bits on the CCTrCH. The CCTrCH is required to contain 160 bits (for example) in order to match the physical channel. Thus, the total rate matching shall output 10 more bits than where input (see FIG. 4a).

By taking into account the individual rate matching offset values, the result is:

$$TrCHa: 50(1+0)=50 \text{ bits} \quad (1)$$

$$TrCHb: 50(1+1/10)=55 \text{ bits} \quad (2)$$

$$TrCHc: 50(1-1/5)=40 \text{ bits} \quad (3)$$

It can be determined that 15 bits are missing (160−(50+55+40)=15). According to one exemplary predefined rule, the 15 additional bits can be apportioned pro rata among the transport channels to match the 160 bits of the CCTrCH:

$$TrCHa: \text{round } (50(1+15/(50+55+40)))=55 \text{ bits} \quad (4)$$

$$TrCHb: \text{round } (55(1+15/(50+55+40)))=61 \text{ bits} \quad (5)$$

$$TrCHc: \text{round } (40(1+15/(50+55+40)))=44 \text{ bits} \quad (6)$$

FIG. 4b illustrates the outcome of using the predefined rules and rate matching offset values to match or balance the various bit rates of the transport channels to the bit rate of the CCTrCH. It should be understood that the above-described operations can be performed by the base station 124 and mirrored by the mobile terminal 130 during downlink communications. or, the above-described operations can be performed by the mobile terminal 130 and mirrored by the base station 124 during uplink operations.

Either the base station 124 or the mobile terminal 130 can perform the following operations to check the relative amounts of rate matching (this check does not need to be done):

$$TrCHb \text{ relative to } TrCHa: (61/50)/(55/50)=1.1=1+1/10 \quad (7)$$

$$TrCHc \text{ relative to } TrCHa: (44/50)/(55/50)=0.8=1-1/5 \quad (8)$$

It should be understood that the mobile terminal 130 receives the rate matching offset values from the UTRAN 120, and can determine the instantaneous bit rates (e.g., 50 bits) using predefined rules that do not require signaling between the UTRAN and mobile terminal (described above).

Figure 5A:
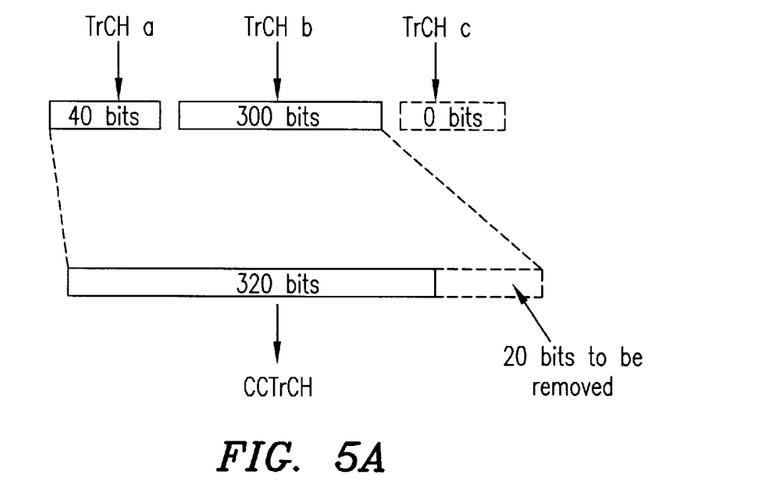
FIGS. 5a and 5b are diagram of pre- and post-matching results of a second example illustrating how to determine total rate matching in accordance with the present invention.
Figure 5B:
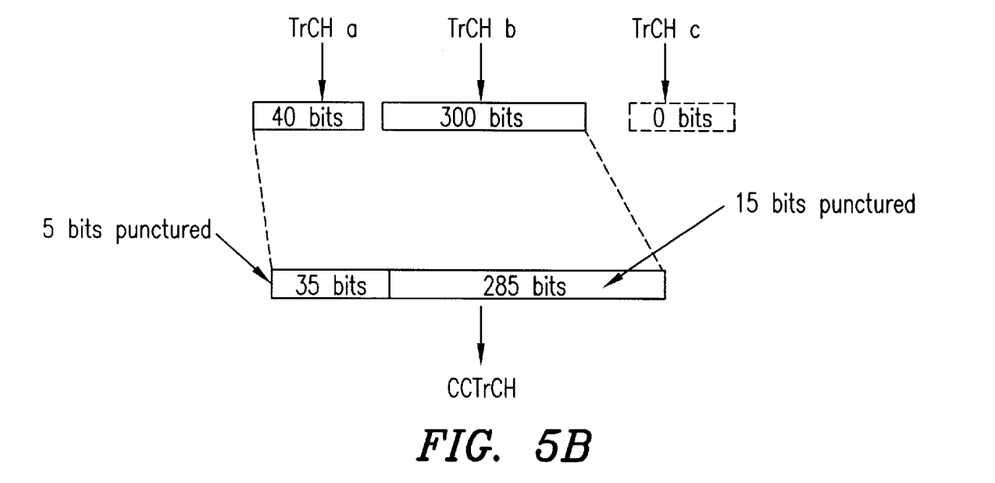

Referring to FIGS. 5a and 5b, there are illustrated the pre-rate matching bit rates (FIG. 5a) and the post-rate matching bit rates (FIG. 5b) of the transport channels and the CCTrCH after applying the predefined rules in a situation where bits are to be removed so that the CCTrCH can match the physical channel. As with the first example, the second example is also just one of many ways to determine total rate matching using rate matching offset values in accordance with the present invention.

Assume that the rate matching offset values for TrCHa, TrCHb and TrCHc remain the same as in the previous example which were as follows: $\Delta rma=0$; $\Delta rmb=1/10$; and $\Delta rmc=-1/5$. However, the data blocks (instantaneous bit rates) on TrCHa is 40 bits, on TrCHb is 300 bits and TrCHc is zero bits. Also, the bit rate of the physical channel has increased to 320 bits such that the total rate matching shall output 20 bits less than were input.

By taking into account the individual rate matching offset values, the result is:

$$TrCHa: 40(1+0)=40 \text{ bits} \tag{9}$$

$$TrCHb: 300(1+1/10)=330 \text{ bits} \tag{10}$$

$$TrCHc: 0 \text{ bits} \tag{11}$$

It can be determined that 50 bits have to be removed from the two blocks associated with TrCHa and/or TrCHb:

$$TrCHa: \text{round } (40(1-50/(40+330+0)))=35 \text{ bits} \tag{12}$$

$$TrCHb: \text{round } (330(1-50/(40+330+0)))=285 \text{ bits} \tag{13}$$

FIG. 5b illustrates the outcome of using the predefined rules and rate matching offset values to match or balance the various bit rates of the transport channels to the bit rate of the CCTrCH. Again, these operations can be performed by the base station 124 and mirrored by the mobile terminal 130 during downlink communications. Or, the above-described operations can be performed by the mobile terminal 130 and mirrored by the base station 124 during uplink communications.

Either the mobile terminal 130 or the base station 124 can perform the following operation to check the relative amounts of rate matching (this check does not need to be done):

$$TrCHb \text{ relative to } TrCHa: (285/300)/(35/40)=1.09 \cong 1+1/10 \tag{14}$$

With respect to both examples, the rate matching offset values remained the same even though the bit rate had changed on the respective transport channels.

Figure 6:
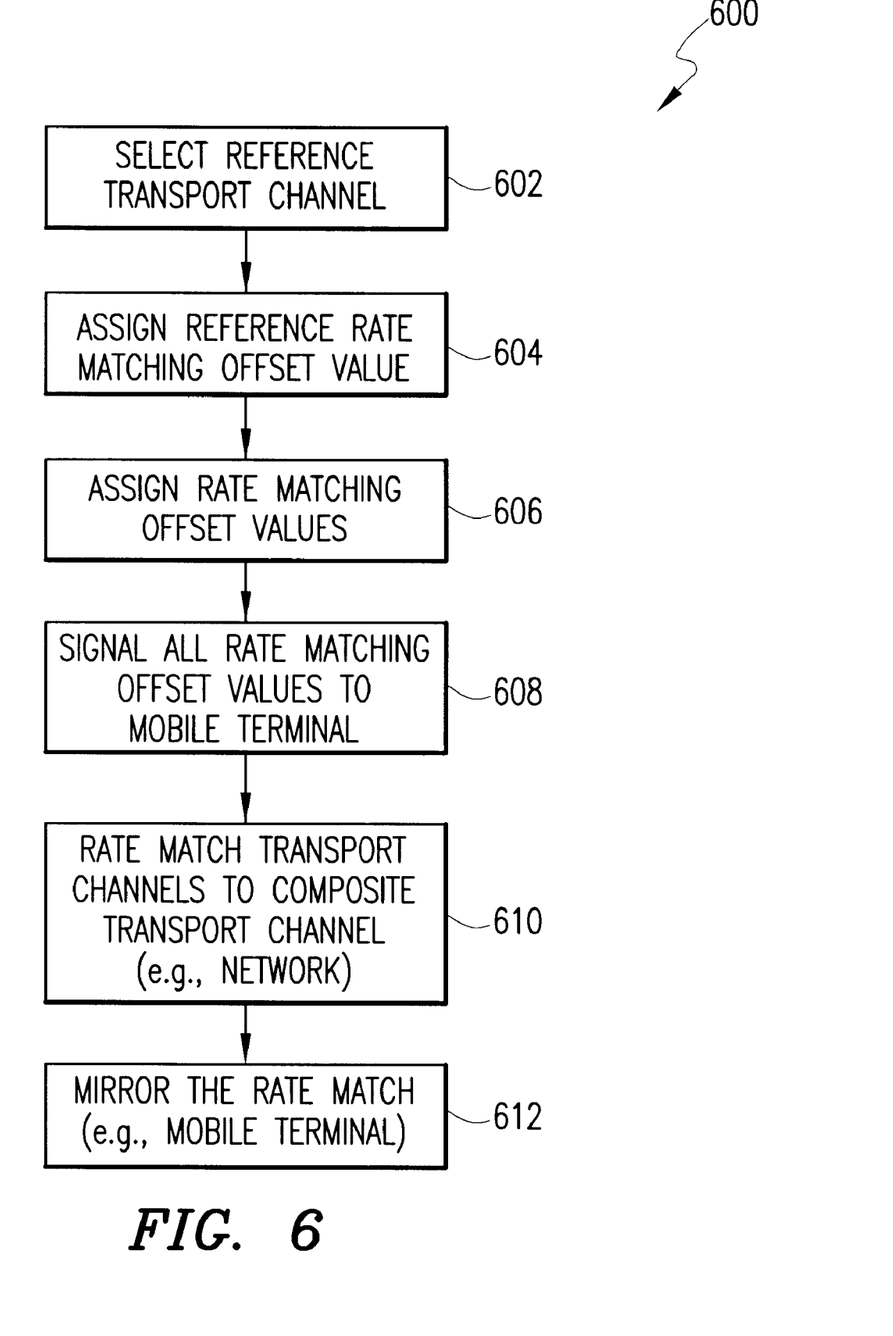
FIG. 6 is a flowchart illustrating the basic steps of a preferred method in accordance with the present invention.

Referring to FIG. 6, there is a flowchart illustrating the basic steps of the preferred method 600 in accordance with the present invention. Basically, the preferred method 600 effectively balances or matches a plurality of bit rates of a plurality of transport channels to a bit rate of a composite transport channel or physical channel using minimal signaling between a network and a mobile terminal.

Beginning at step 602, the network (UTRAN) 120 selects one of the plurality of transport channels 300 to be the reference transport channel. As mentioned above, the reference transport channel can be the transport channel containing the dedicated control signaling. Also, the network 120 can change the reference transport channel by signaling a definition as to which one of the remaining transport channels 300 is to be a new reference transport channel while tearing down the previous reference transport channel. Alternatively, a predefined rule could indicate which remaining transport channel shall be used.

At step 604, the network 120 assigns a reference rate matching offset value (e.g., Δrm=0) to the reference transport channel. Again, the reference rate matching offset value does not need to be assigned if the value is always the same (e.g., Δrm=0). In addition, the network 120 also assigns (step 606) rate matching offset values (e.g., Δrm=±X) to each of the remaining transport channels. Thereafter, the network 120 signals (step 608) all of the rate matching offset values to the mobile terminal 130.

At step 610, the network 120 (during downlink communications) or the mobile terminal 130 (during uplink communications) operates to rate match (see FIG. 7) the transport channels 300 to the composite transport channel 312 using predefined rules and the rate matching offset values.

At step 612, the network 120 (during uplink communications) or the mobile terminal 130 (during downlink communications) operates to mirror the above-mentioned rate matching operation. That is, repeated bits are taken away before decoding, and bits that need to be added before decoding are inserted at places where the UTRAN 120 applied puncturing.

Figure 7:
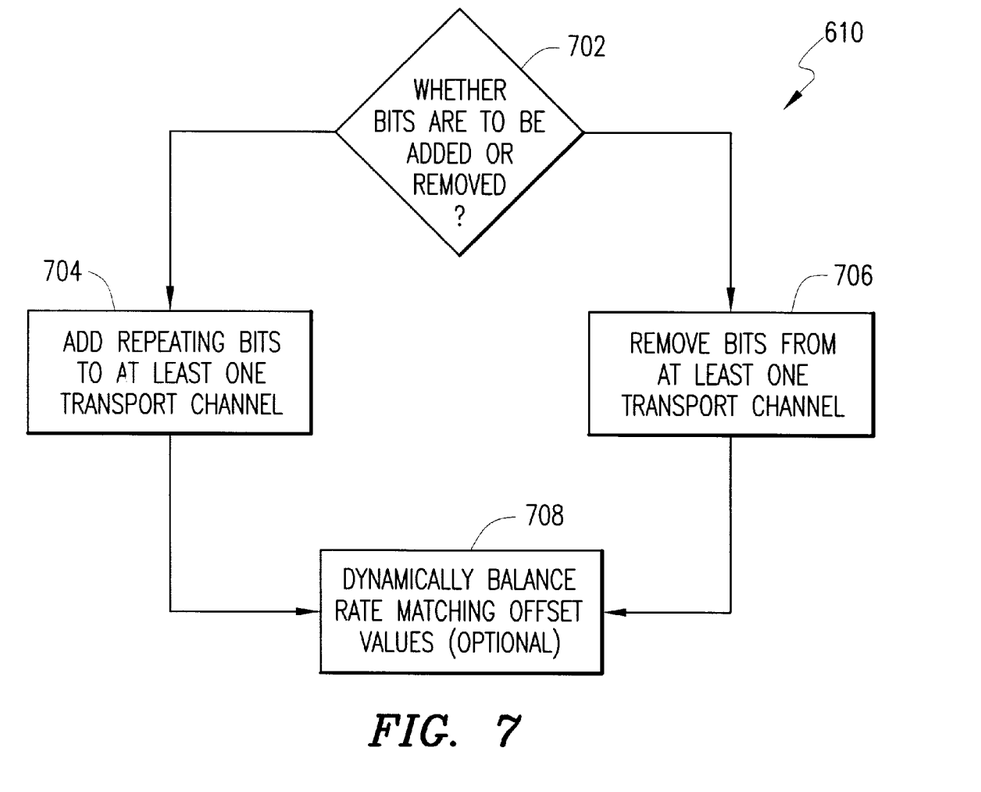
FIG. 7 is a flowchart illustrating a rate matching operation for the preferred method shown in FIG. 6.

Referring to FIG. 7, there is a flowchart illustrating in greater detail the rate matching step 610 of the preferred method 600. At step 702, the network 120 (during downlink communications) or the mobile terminal 130 (during uplink communications) using the above-described predefined rules (see FIGS. 4–5) determines whether more bits are to be added or some bits are to be removed from the transport channel(s) so that the bit rate of the composite transport channel 312 can match the bit rate of the physical channel 316.

If the composite transport channel requires more bits, then repeating bits are added (step 704) to at least one of the transport channels 300. Depending on the relative values of the rate matching offset values even though bits are to be added to the composite transport channel it is possible that some bits can be punctured or removed from one or more transport channels and still enable a proper balance.

Otherwise if the composite transport channel requires less bits, then a predetermined number of bits are removed or punctured (step 706) from at least one of the transport channels 300. Like above, depending on the relative values of the rate matching offset values even though bits are to be punctured it is possible that some bits can be added or repeated in the transport channels and still enable a proper balance.

At step 708 (optional), the network 120 can dynamically adjust values of the rate matching offset values if so desired. A noticeable impact on the quality difference between the transport channels 300 may be provided by dynamically adjusting the rate matching offset values. On the other hand, additional overhead is also introduced into the communications system by dynamically adjusting the rate matching offset values.

From the foregoing, it can be readily appreciated by those skilled in the art that the present invention provides a communications system and method that helps ensure the quality of communications between the network and mobile terminal by enabling both the network and mobile terminal to know the correct balancing. The communications system also provides the correct balancing at both ends by using relative quality measures and predefined rules known by the network and mobile terminal. Also, the communications system as disclosed effectively minimizes the amount of signaling needed for rate matching balancing the transport channels that are multiplexed onto a physical channel by using rate matching offset values.

Although exemplary embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for controlling rate matching among different channels used to deliver services via a mobile terminal, said method comprising the steps of:

signaling from a network to the mobile terminal, a plurality of relative offset measures associated with the different channels; and bit rate matching, within a selected one of the mobile terminal and the network, the different channels to a physical channel using predefined rules and the plurality of relative offset measures, wherein each channel supports at least one of the services that are multiplexed onto the physical channel which supports all of the services currently in use by the mobile terminal.

2. The method of claim 1, further comprising the step of mirroring said step of bit rate matching.

3. The method of claim 1, wherein said step of bit rate matching further includes determining whether more or less bits are to be included in a bit rate of at least one of the plurality of channels to match a bit rate of the physical channel.

4. The method of claim 3, wherein if more bits are to be included in the bit rate of the at least one channel then said step of bit rate matching further includes repeating bits in the at least one channel.

5. The method of claim 3, wherein if less bits are to be included in the bit rate of the at least one channel then said step of bit rate matching further includes puncturing bits in the at least one channel.

6. The method of claim 1, wherein each relative offset measure further includes a value indicating a quality of service.

7. The method of claim 1, wherein each relative offset measure further includes a value corresponding to a particular quality value.

8. A method for balancing a plurality of bit rates of a plurality of transport channels to a bit rate of a composite transport channel, said method comprising the steps of:
  selecting one of the plurality of transport channels to be a reference transport channel;
  assigning a reference rate matching offset value to the reference transport channel;
  assigning respective rate matching offset values to each of the remaining plurality of transport channels; and
  rate matching the plurality of transport channels to the composite transport channel using predefined rules, the rate matching offset values and the reference rate matching offset value.

9. The method of claim 8, wherein said step of rate matching further includes determining whether more or less bits are to be included in the bit rate of the composite transport channel to match a bit rate of at least one physical channel.

10. The method of claim 9, wherein if more bits are to be included in the bit rate of the composite transport channel then said step of rate matching further includes repeating bits in at least one of the plurality of transport channels.

11. The method of claim 9, wherein if less bits are to be included in the bit rate of the composite transport channel then said step of rate matching further includes puncturing bits in at least one of the plurality of transport channels.

12. The method of claim 8, further comprising a step of mirroring said step of rate matching.

13. The method of claim 8 wherein each rate matching offset value corresponds to a quality of a service.

14. The method of claim 13, wherein said service further includes data, E-mail, speech, Internet or video.

15. The method of claim 8, wherein said step of selecting further includes changing the reference transport channel by signaling a definition as to which one of the remaining plurality of transport channels is to be a new reference transport channel.

16. The method of claim 15, wherein said step of changing further includes tearing down the previous reference transport channel.

17. The method of claim 8, wherein the reference transport channel further includes the transport channel containing dedicated control signaling.

18. The method of claim 8, wherein said step of rate matching further includes dynamically adjusting the rate matching offset values.

19. The method of claim 8, wherein said steps of assigning further includes signaling the rate matching offset values and the reference rate matching offset value from a network to a mobile terminal.

20. The method of claim 19, further comprising the step of performing said step of rate matching in the network or the mobile terminal.

21. A communications system for matching a plurality of bit rates of a plurality of transport channels to a bit rate of a physical channel, said communications system comprising:
  a network for assigning and signaling a plurality of rate matching offset values respectively corresponding to the plurality of transport channels;
  a mobile terminal for receiving the plurality of rate matching offset values;
  one of said network and said mobile terminal operable to rate match the plurality of transport channels to the physical channel using predefined rules and relative quality measures associated with the respective rate matching offset values.

22. The communications system of claim 21, wherein the other of said network and said mobile terminal further includes means for mirroring the rate match performed by said one of said network and said mobile terminal.

23. The communications system of claim 21, wherein said network further includes:
  means for selecting one of the plurality of transport channels to be a reference transport channel; and
  means for assigning a reference rate matching offset value to the reference transport channel.

24. The communications system of claim 23, wherein said network further includes means for changing the reference transport channel by signaling a definition as to which one of the remaining plurality of transport channels is to be a new reference transport channel after tearing down the previous reference transport channel.

25. The communications system of claim 24, wherein said reference transport channel further includes the transport channel containing dedicated control signaling.

26. The communications system of claim 21, wherein said network further includes:
  means for setting up a new transport channel;
  means for assigning a new rate matching offset value to the new transport channel; and
  means for signaling the new rate matching offset value to the mobile terminal.

27. The communications system of claim 21, wherein said network and said mobile terminal each include means for determining whether more or less bits are to be included in the bit rate of each transport channel to match a bit rate of the physical channel.

28. The communications system of claim 27, wherein if more bits are to be included in the bit rate of at least one of the plurality of transport channels then said selected one of said network and said mobile terminal further includes means for repeating bits in the at least one transport channel.

29. The communications system of claim 27, wherein if less bits are to be included in the bit rate of at least one of the plurality of transport channels then said selected one of said network and said mobile terminal further includes means for puncturing bits in the at least one transport channel.

30. The communications system of claim 21, wherein each relative measure corresponds to a quality value including a selected one of $E_b/N_o$ and $E_s/N_o$.

31. The communications system of claim 21, wherein each rate matching offset value corresponds to a quality of a service including data, E-mail, speech, Internet or video.

32. The communications system of claim 21, wherein said network further includes means for dynamically adjusting the rate matching offset values.

33. The communications system of claim 21, wherein said communications system further includes a wideband code division multiple access communications system.

* * * * *

UNITED STATES PATENT AND TRADEMARK OFFICE
CERTIFICATE OF CORRECTION

PATENT NO. : 6,473,442 B1
DATED : October 29, 2002
INVENTOR(S) : Johan Lundsjo et al.

Page 1 of 1

It is certified that error appears in the above-identified patent and that said Letters Patent is hereby corrected as shown below:

Column 4,
Line 9, replace "RLC PDUS" with -- RLC PDUs --

Column 8,
Line 36, replace "communications. or," with -- communications. Or, --

Column 9,
Line 30, replace "$1.09 \equiv 1+1/10$" with -- $1.09 \cong 1+1/10$ --

Signed and Sealed this

Twenty-ninth Day of April, 2003

JAMES E. ROGAN
*Director of the United States Patent and Trademark Office*